(12) United States Patent
Di Pietro et al.

(10) Patent No.: US 8,953,472 B2
(45) Date of Patent: Feb. 10, 2015

(54) METHOD FOR MONITORING A NETWORK AND NETWORK INCLUDING A MONITORING FUNCTIONALITY

(75) Inventors: Andrea Di Pietro, Heidelberg (DE); Felipe Huici, Dossenheim (DE); Diego Costantini, Darmstadt (DE); Saverio Niccolini, Heidelberg (DE)

(73) Assignee: NEC Europe Ltd., Heidelberg (DE)

( * ) Notice: Subject to any disclaimer, the term of this patent is extended or adjusted under 35 U.S.C. 154(b) by 256 days.

(21) Appl. No.: 13/393,563

(22) PCT Filed: Aug. 31, 2010

(86) PCT No.: PCT/EP2010/005344
§ 371 (c)(1),
(2), (4) Date: Apr. 25, 2012

(87) PCT Pub. No.: WO2011/026604
PCT Pub. Date: Mar. 10, 2011

(65) Prior Publication Data
US 2012/0207046 A1 Aug. 16, 2012

(30) Foreign Application Priority Data

Sep. 1, 2009 (EP) .................................. 09011192

(51) Int. Cl.
| | |
|---|---|
| *G01R 31/08* | (2006.01) |
| *G06F 11/00* | (2006.01) |
| *G08C 15/00* | (2006.01) |
| *H04J 1/16* | (2006.01) |
| *H04J 3/14* | (2006.01) |
| *H04L 1/00* | (2006.01) |
| *H04L 12/26* | (2006.01) |
| *H04L 12/28* | (2006.01) |
| *H04L 29/06* | (2006.01) |
| *H04L 12/24* | (2006.01) |

(52) U.S. Cl.
CPC ............ *H04L 43/02* (2013.01); *H04L 63/1425* (2013.01); *H04L 41/16* (2013.01)
USPC ........................................... 370/252; 370/400

(58) Field of Classification Search
None
See application file for complete search history.

(56) References Cited

U.S. PATENT DOCUMENTS 7,584,507 B1 * 9/2009 Nucci .............................. 726/23
7,620,712 B1 * 11/2009 Allan ........................... 709/224

(Continued)

FOREIGN PATENT DOCUMENTS

| JP | H088951 A | 1/1996 |
|---|---|---|
| JP | 2007228112 A | 9/2007 |
| WO | 2005/107207 A1 | 11/2005 |

OTHER PUBLICATIONS

International Search Report, dated Dec. 20, 2010, from corresponding PCT application.

(Continued)

*Primary Examiner* — Suk Jin Kang
(74) *Attorney, Agent, or Firm* — Young & Thompson

(57) ABSTRACT

A method for monitoring a network, wherein the network has a connected graph topology, in particular a tree structure, including a plurality of monitoring nodes that collect network measurement data, a plurality of mediator nodes each performing at least the task of aggregating network measurement data received from different monitoring nodes and/or other mediator nodes, and at least one root entity that receives network measurement data and/or aggregated network measurement data from the mediator nodes, is characterized in that the aggregation of network measurement data is performed by condensing network measurement data into a summarized probabilistic data structure. Furthermore, a network including a monitoring functionality is disclosed.

18 Claims, 2 Drawing Sheets

(56) References Cited

U.S. PATENT DOCUMENTS

Figure 1:
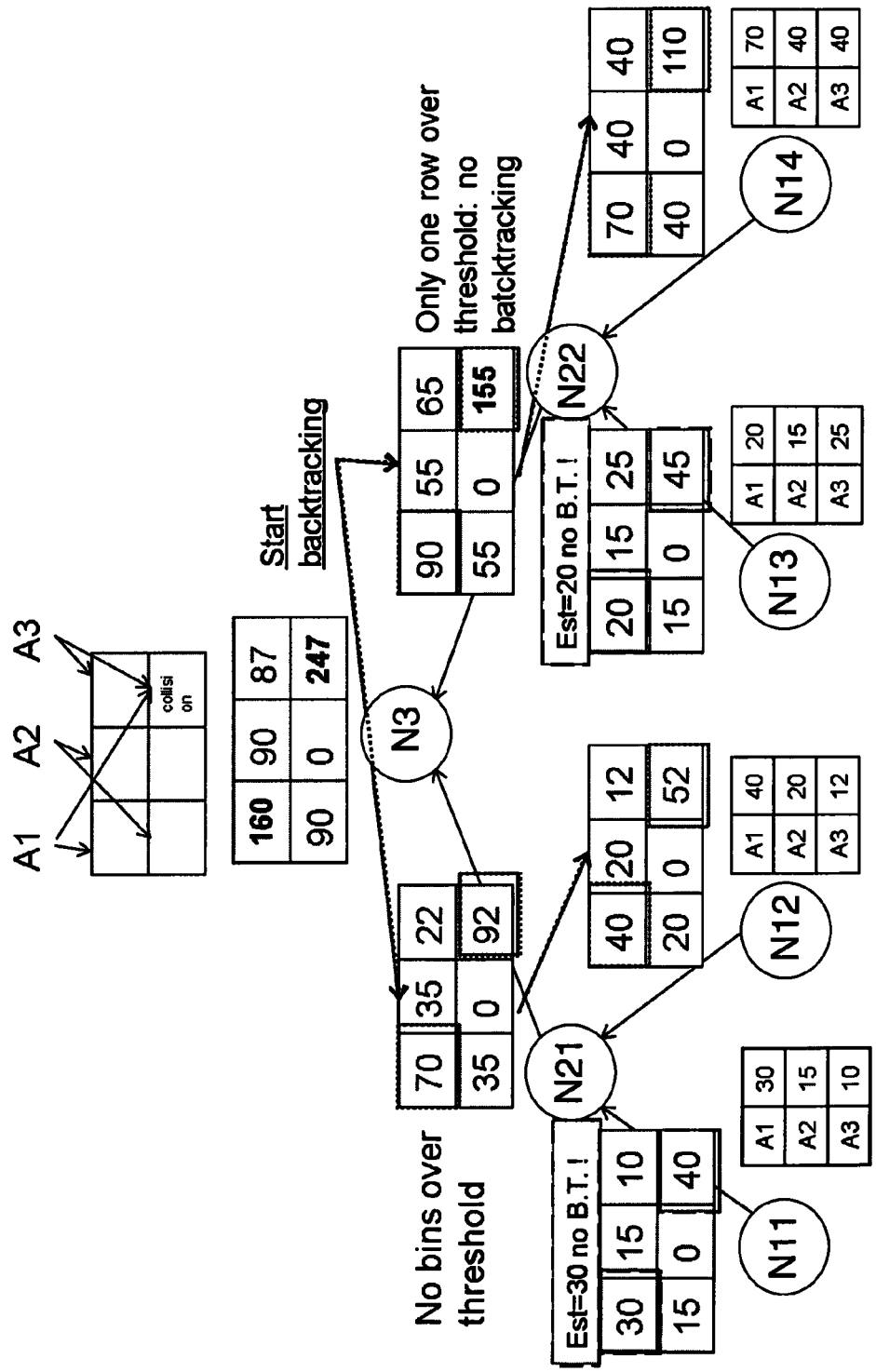

| | | |
|---|---|---|
| 8,260,910 B2 * | 9/2012 | Schuba et al. ............. 709/224 |
| 8,601,112 B1 * | 12/2013 | Nordstrom et al. ........... 709/224 |
| 2003/0005036 A1 * | 1/2003 | Mitzenmacher ............. 709/203 |
| 2005/0129017 A1 * | 6/2005 | Guingo et al. ............. 370/390 |
| 2008/0195597 A1 * | 8/2008 | Rosenfeld et al. ............. 707/5 |
| 2008/0201772 A1 * | 8/2008 | Mondaeev et al. ............. 726/13 |
| 2008/0301218 A1 * | 12/2008 | Mukherjee et al. ........... 709/203 |
| 2009/0016353 A1 * | 1/2009 | Li et al. ............. 370/395.3 |
| 2010/0030840 A1 * | 2/2010 | O'Shea et al. ............. 709/201 |
| 2010/0058469 A1 * | 3/2010 | Yen et al. ............. 726/22 |
| 2010/0064368 A1 * | 3/2010 | Stolfo et al. ............. 726/24 |
| 2011/0007747 A1 * | 1/2011 | Ellis ............. 370/401 |
| 2011/0179488 A1 * | 7/2011 | Mankins ............. 726/23 |
| 2012/0197852 A1 * | 8/2012 | Dutta et al. ............. 707/692 |
| 2012/0197856 A1 * | 8/2012 | Banka et al. ............. 707/706 |
| 2012/0197898 A1 * | 8/2012 | Pandey et al. ............. 707/741 |
| 2012/0197911 A1 * | 8/2012 | Banka et al. ............. 707/752 |
| 2012/0331123 A1 * | 12/2012 | Allan ............. 709/223 |
| 2013/0254421 A1 * | 9/2013 | Mondaeev et al. ........... 709/235 |

OTHER PUBLICATIONS

Winnie Louis Lee et al., "Network Management in Wireless Sensor Network", Retrieved from the Internet: URL:http://www.csse.uwa.edu.au/{winnie/Network_Management_in_WSNs_.pdf, 2006, pp. 1-20, XP-002613337; Cited in International Search Report.

Manish Raj Sharma, "Scalable Coordination Techniques for Distributed Network Monitoring", Masters Thesis, Boston University, Graduate School of Arts and Sciences, 2004, Retrieved from the Internet: URL:http://www.cs.bu.edu/gradprogram/thesis/ManishSharma.MA.thesis.pdf, XP-002570923; Cited in International Search Report.

Yi-Chi Wu et al., "DDoS Detection and Traceback with Decision Tree and Grey Relational Analysis", 2009 Third International Conference on Multimedia and Ubiquitous Engineering, Jun. 4, 2009, pp. 306-314; Cited in International Search Report.

Japanese Office Action from corresponding JP application. (Jun. 25, 2012).

* cited by examiner

METHOD FOR MONITORING A NETWORK AND NETWORK INCLUDING A MONITORING FUNCTIONALITY

CROSS-REFERENCES TO RELATED APPLICATIONS

This application is a U.S. National Stage of PCT/EP2010/005344 filed Aug. 31, 2010 and claiming priority to EP 0901192.3 filed Sep. 1, 2009.

BACKGROUND OF THE INVENTION

The present invention relates to a method for monitoring a network, wherein said network has a connected graph topology, in particular a tree structure, including a plurality of monitoring nodes that collect network measurement data, a plurality of mediator nodes each performing at least the task of aggregating network measurement data received from different monitoring nodes and/or other mediator nodes, and at least one root entity that receives network measurement data and/or aggregated network measurement data from said mediator nodes.

Furthermore, the present invention relates to a network including a monitoring functionality, wherein said network has a connected graph topology, in particular a tree structure, including a plurality of monitoring nodes that collect network measurement data, a plurality of mediator nodes each performing at least the task of aggregating network measurement data received from different monitoring nodes and/or other mediator nodes, and at least one root entity that receives network measurement data and/or aggregated network measurement data from said mediator nodes.

DESCRIPTION OF THE RELATED ART

Monitoring is crucial both to the correct operation of a network and to the services that run on it. Operators perform monitoring for various purposes, including traffic engineering, quality of service, security and detection of faults and misconfigurations. Since traffic relevant to these applications typically tends to flow through several points in the network, a distributed monitoring architecture is needed in order to track it.

Unfortunately, monitoring traffic in real-time and in a distributed way presents a range of difficult issues. The first of these is scalability: the volume of traffic to be monitored is rapidly growing, with reports stating that the annual global IP traffic volume will exceed half a zettabyte ($5 \times 10^{20}$ bytes) by 2012 and will nearly double every two years (see for reference "Approaching the zettabyte era"; this growth puts serious stress on any monitoring infrastructure that tries to centralize the collection of data. Another issue is privacy, since any monitoring architecture should ensure that it can accomplish its intended purpose without infringing on end-users' privacy. Further, several applications (e.g., law enforcement, security incident reporting, etc) have the need to backtrack to the originating monitoring probe in order to retrieve more detailed information, a requirement that could not be met by a simple scheme that exports only summarized information to achieve scalability and privacy-preservation.

While some solutions in the area exist, none of them are able to tackle all of these issues at once.

At present most of the monitoring systems which are actually used both for performance and security monitoring are based on a simplistic paradigm in which several probes monitor the traffic flowing through different vantage points and send reports of their observations to a single collecting device; such collector can then process the local data reports produced by each monitoring node in order to issue a global report of the network state and to possibly reveal network-wide anomalies.

Unfortunately, this model does not scale with the growing amount of monitored data. Current proposals to overcome such scalability issues propose to make use of intermediate mediator nodes being able to collect, store, aggregate and further export the monitored data towards the collection points. However, such solutions so far do not tackle the issue of inter-connecting different administrative domains (i.e., they are all single-administrative domain solutions). Unfortunately, in order to detect certain kinds of anomalies (botnet attacks are a good example), correlation of monitoring data collected in different administrative domains is needed. However, disclosure of data which may (even indirectly) leak information about the identity of individual users is in general prevented by existing legislation.

Several proposals have been made in order to address some of these problems. Monitoring systems which leverage peer-to-peer network technologies have been designed. Solutions based on distributed aggregation trees (DATs) ensure scalability to the system, but, so far, they have been usually limited to monitoring of only a few aggregated performance parameters (for instance, see for reference Yalagandula, P. and Dahlin, M. 2004. A scalable distributed information management system. SIGCOMM Comput. Commun. Rev. 34, 4 (August 2004), 379-390, and 2007. WormShield: Fast Worm Signature Generation with Distributed Fingerprint Aggregation. IEEE Trans. Dependable Secur. Comput. 4, 2 (April 2007), 88-104. Further, they lack the flexibility needed to monitor the network behavior at a higher granularity. In any case, they do not allow attributing anomalous behavior to single users and they do not take privacy into consideration. Further, they do not offer support for after-the-fact auditing of the relevant logs.

On the other hand, systems which were specifically intended for alert correlation (and which can in some cases report back to the original alert generator, like the system described in Paul Williams, Kevin Anchor, John Bebo, Gregg Gunsch, and Gary Lamont, CDIS: Towards a Computer Immune System for Detecting Network Intrusions, Proc. 4th Int'l Symp., Recent Advances in Intrusion Detection 2001, pp. 117-133, Springer-Verlag, Berlin, 2001) generally rely on the capability of the local probes to autonomously detect suspicious events, despite the fact that, in several cases, anomalies can only be detected from a global perspective. Worse, most of them still adopt a single collector model.

SUMMARY OF THE INVENTION

It is therefore an object of the present invention to improve and further develop a method for monitoring a network and a network of the initially described type in such a way that, by employing mechanisms that are readily to implement, effective aggregation of large amounts of monitoring data for the detection of anomalous patterns is supported, while at the same time privacy of users is preserved. Furthermore, scalability to a large number of monitoring nodes shall be achieved.

In accordance with the invention, the aforementioned object is accomplished by a method comprising the features of disclosed below. Such a method that aggregation of network measurement data is performed by condensing network measurement data into a summarized probabilistic data structure.

Furthermore, the aforementioned object is accomplished by a network comprising the features disclosed below, such a network is characterized in that said mediator nodes are configured to perform said aggregation of network measurement data by condensing network measurement data into a summarized probabilistic data structure.

According to the invention it has been recognized that an effective, privacy-preserving and scalable aggregation with backtracking support can be achieved by introducing summarizing probabilistic data structures, into which detailed information collected by the monitoring nodes is condensed. Insofar, the present invention consists of a framework that allows aggregation of network measurement data issued by several probes while still preserving the possibility of locating the probes which have logged and exported the events of interest. The measured data is transferred among the nodes involved in the process by means of probabilistic data structures, whose properties may also be leveraged in order to reveal the events of interest and to enable to drive a backtracking process.

From a general point of view, the advantage of the present invention consists in the fact that it allows for a multi-domain exchange for pattern detection since the anonymity of users being monitored is preserved; this is one of the key points that prevented previous multi-domain solutions to be adopted in reality. Further, it allows for the creation of a scalable framework for aggregation of measurement data while still supporting the possibility of retrieving more accurate after-the-fact logs. Compared to DAT-based solutions, the present solution provides more flexibility in accommodating a huge amount of data while still preserving high granularity. The backtracking capability allows checking complete data records in case a pattern is detected. With respect to traditional alert correlation (like for instance spacedive or Cids), the present invention is more scalable, privacy preserving, and it does not (necessarily) rely on the probes being able to locally detect relevant information (suspicious behavior).

According to a preferred embodiment it may be provided that the summarized data structures include Bloom Filters and/or sketches, which are two well-known probabilistic data structures being widely deployed. However, other embodiments can accommodate other summarizing data structures as well, as long as the following requirements are fulfilled: First, they have to be linear with respect to aggregation, i.e. the aggregation of the data structures summarizing two sets of events must be equal to an analogous data structure summarizing the union of the two sets of events. Secondly, as already discussed above they have to be non-reversible in order to assure that monitoring and aggregation of detailed data is performed in a privacy preserving manner. Further to these two requirements it is favorable with respect to an efficient aggregation process that the data structures have a low memory footprint and query time, i.e. that they are independent on the number of logged keys. Finally, the data structures should avoid the occurrence of false negatives, while the occurrence of false positives is basically allowed. The impact of false positives can be evaluated on a case-by-case basis. Depending on the application, a proper combination of probabilistic data structures can be used. As an example, a report of measurement data may be composed of a sketch as well as a Bloom Filter.

With respect to an effective backtracking process it may be provided that each mediator node caches a local copy of the summarized data structure it has generated.

For detecting anomalous network behavior it may be provided that each mediator node performs a pattern check on its summarized data structure. More specifically, the mediator nodes are configured to check their aggregated summaries for any anomalous pattern, with the definition of an anomalous pattern depending directly on the monitoring application and/or on the adopted data structure. Examples of anomalous patterns may be the evidence that an event counter associated to a user (or a set of users) has exceeded a given threshold, or the evidence that a certain number of distinct users are reported to be performing malicious activities. Further, an anomalous pattern may result from evidence that a certain pattern of events has been detected at the network level. Additionally, in order to detect event patterns that involve variations in measurement data, a mediator node may also cache some of the reports that it received in the past and that, properly combined with the present report, can be used to track changes in the network behavior.

According to a further preferred embodiment it may be provided that a mediator node, in case a pattern check outputs any anomalous pattern, triggers a backtracking process. Furthermore, the respective mediator node may issue an alarm to the corresponding network administration facility, in order to inform it appropriately. Advantageously, with respect to the trigger for a backtracking process, it may be provided that the respective mediator node issues to each of its children a backtracking request including some details about the detected anomalous pattern.

Based on the backtracking trigger it may be further provided that each mediator node that receives a backtracking request checks its cached copy of the summarized data structure against said backtracking request. If the result of the check reveals that any of the nodes having contributed to the mediator node's summarized data structure may have logged relevant data, the mediator node forwards the backtracking request to its children. It is to be noted that the backtracking propagation criterion may be both application- and data structure-dependent.

Whenever a backtracking request reaches relevant monitoring nodes, it may be provided that their logged data are extensively examined in order to learn details of the network anomaly and its origin and/or it causation. In this context it proves to be beneficial to also perform more detailed checks that allow for discarding the false positives which may be produced due to the probabilistic nature of the adopted data structures.

With respect to preserving the privacy of the data, a monitoring node may be configured to release detailed information only to parties that present the necessary credentials. Therefore, although suspicious behavior of individual users can be detected upon aggregation, no information about their identity is leaked.

Since the number of hops for both aggregation and backtracking is limited, the monitoring nodes can safely discard their logs based on a timeout.

With respect to a continuous monitoring process that provides reliable results on a regular basis, it may be provided that the monitoring nodes and/or the mediator nodes periodically produce a probabilistic data structure, which they forward to their parents in the network topology.

BRIEF DESCRIPTION OF THE DRAWING FIGURES

Figure 2:
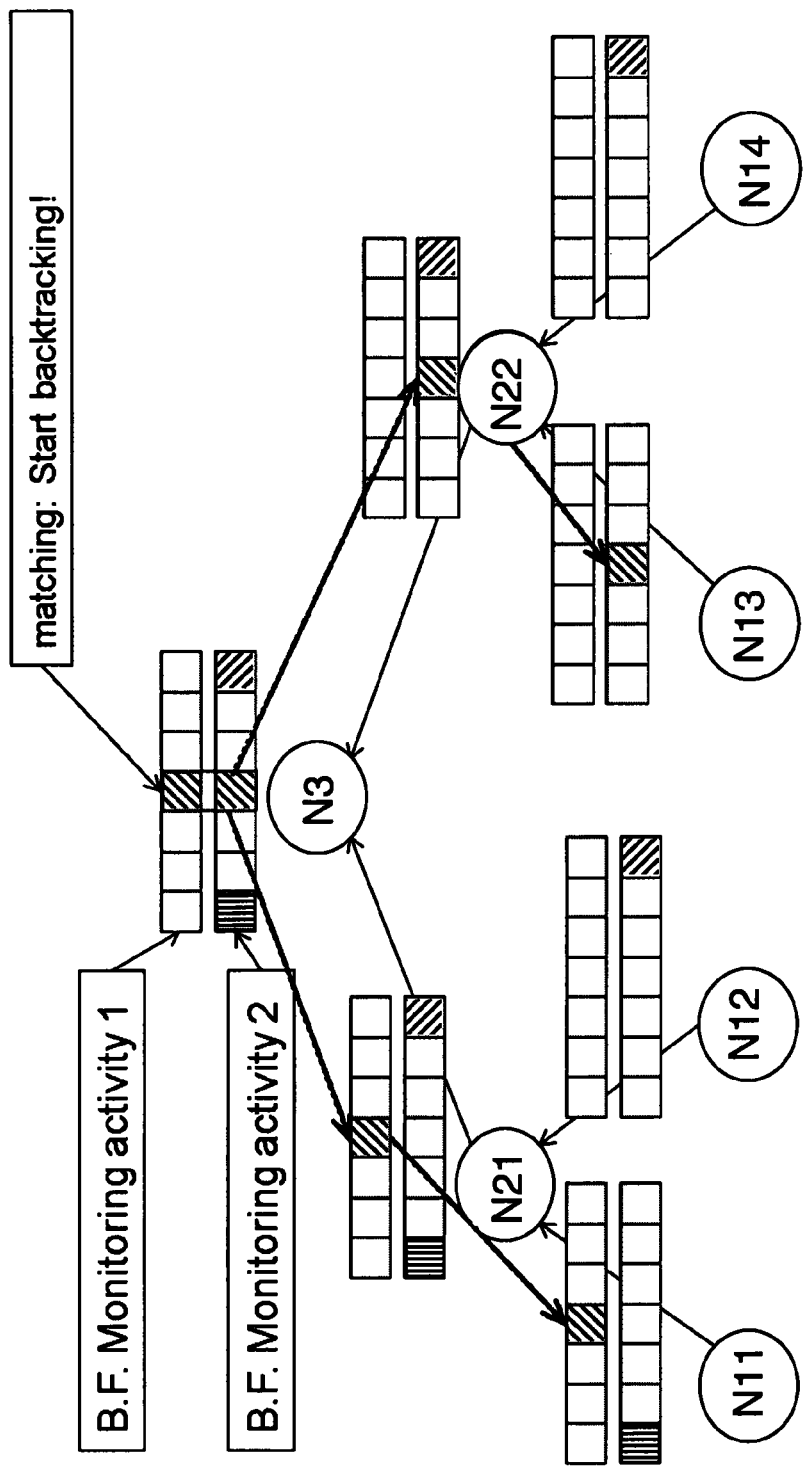

There are several ways how to design and further develop the teaching of the present invention in an advantageous way. To this end, it is to be referred to the patent claims and to the following explanation of preferred examples of embodiments of the invention, illustrated by the figures. In connection with the explanation of the preferred examples of embodiments of the invention by the aid of the figures, generally preferred embodiments and further developments of the teaching will be explained. In the drawings FIG. 1 is a schematic view illustrating a first embodiment of the present invention for detecting whether a counter associated with a network variable exceeds a given threshold, and FIG. 2 is a schematic view illustrating a second embodiment of the present invention for finding matching patterns among the output of different monitoring activities.

DETAILED DESCRIPTION OF THE INVENTION

According to a preferred embodiment of the present invention, two complementary mechanisms are realized, which are privacy-preserving aggregation and backtracking. According to the invention probabilistic data structures are used, having the effect of achieving both mechanisms at the same time while preserving the privacy of the users being monitored.

One of the key applications of the present invention would be to support a distributed, cross-domain monitoring architecture that is scalable, protects the privacy of the monitored data, and allows for backtracking to the original monitoring probe for after-the-fact auditing by identification of the probes which have collected relevant information.

To simplify the description of the embodiments illustrated in the Figs. it is assumed that the monitoring nodes are arranged in a tree structure (although any connected graph would work). In this tree structure the leaves of the tree represent the network probes (or monitoring nodes) collecting the network data; the inner nodes represent either so-called mediator nodes (performing tasks of collecting, eventually storing, further processing and exporting the data received) or collector nodes (eventually performing all mediator tasks except exporting). Detailed information is collected by the probes and condensed into summarized, probabilistic, and privacy-preserving data structures (bloom filters and counting sketches are two examples of such data structures). Such data structures, besides efficiently aggregating information, are non-reversible, so that it is impossible for them to leak information about specific users; the monitoring and aggregation of detailed data is therefore performed in a privacy preserving manner (i.e. without revealing the identity of the originator).

At each mediator node of the tree the summarized structures which have been received from the children are aggregated, and a pattern check (dependent on the application consuming such information) is performed on the aggregated summary. The node then caches such information in order to support the backtracking mechanism and forwards the aggregated summary to its parent node in the tree. The process continues up the tree until the root (the collector) is reached.

With this in place, the probes which have logged information which is relevant for after-the-fact auditing can be located in a distributed way by triggering the backtracking mechanism if the pattern check is positive (e.g., an alarm is raised on the volume of traffic generated by a certain host).

In more detail, a node will issue a backtracking request to its children along with some aggregate information that will be used to drive the backtracking propagation. Its children will, in turn, correlate this aggregated data with their own cached ones and, based on the result, will decide whether to propagate the backtracking request to their own children in the tree. This procedure continues in a recursive manner until all of the probes that have logged relevant information have been reached. The backtracking mechanism also includes a discarding feature that ignores false results (i.e., backtracking requests issued to nodes that had not exported any relevant data) arising from the probabilistic nature of the data structures used. It is worth noting that in order to preserve the privacy of the data, a monitoring probe would release detailed information only to parties that present the necessary credentials.

In order to explain details of the present invention, and to prove its applicability in real-world scenarios, two embodiments of the invention for two particular use cases are described in the following in a more detailed way.

In the first one, illustrated in FIG. 1 an embodiment of the invention is used in order to detect whether a counter associated with a given network variable exceeds a given threshold at a network-wide level. It is to be noted that, in this case, the monitoring nodes—probes—are collecting measurements associated with a possibly huge set of network variables that may potentially overcome the threshold. Aggregating a separate counter for each of them would not be scalable, since it would produce an excessive amount of network traffic. However, the backtracking process allows retrieving enough information to finally identify the responsible variable.

More specifically, FIG. 1 illustrates a part of a network having a tree structure. In other words, the framework of the embodiment of FIG. 1 assumes the nodes of the monitoring architecture to be arranged in a logical tree topology, where the leaves represent data collectors and the internal nodes act as data mediator nodes. Such an abstraction may in fact be realized using several kinds of network architectures, such as Distributed Aggregation Trees (DATs) built on top of a peer to peer network. Collection and mediation activities may in fact be performed on the same physical nodes. In FIG. 1, the nodes denoted N11, N12, N13, and N14 are the leaves functioning as monitoring probes, the nodes denoted N21 and N22 are internal nodes functioning as mediator nodes, and the node denoted N3 is the root at which all aggregated network monitoring data flows together.

The general aggregation and backtracking mechanisms works as follows:

Each of the probes N11, N12, N13, and N14 logs its traffic and periodically produces a summarized probabilistic data structure which it forwards to its parent in the tree.

Each intermediate node N21 and N22 in the tree computes, by using the associated aggregation mechanism, a summarized structure out of those that it received from its children in the tree, and, in turn, forwards it to its parent in the tree while caching a local copy in order to allow for backtracking. The intermediate nodes N21 and N22 also check the aggregated summary for any anomalous pattern.

In case the pattern check outputs a positive result, an intermediate node N21, N22 may issue an alarm to the corresponding network administration facility and trigger the backtracking process. In particular, it will issue to each of its children a backtracking request including some details about the detected pattern.

Each of the intermediate nodes N21 and N22 receiving a backtracking request will check its cached copy of the summarized data structure against the backtracking request. If the result of the check shows that some of the nodes contributing to the aggregated summary may have logged relevant data, the request is forwarded to the children.

Whenever the backtracking requests have reached all of the relevant probes, their logged data can be extensively examined.

In the embodiment illustrated in FIG. 1, in order to account for the counter associated with each network variable, a count-min sketch data structure is adopted. Such data structure has been widely proposed in the literature in order to summarize large arrays of counters and to detect outliers out of them (for reference, see for instance A. Graham Cormode and A S. Muthukrishnan: "An improved data stream summary: the count-min sketch and its applications." Journal of Algorithms, April 2005, Academic Press, Inc., which is incorporated herein by way of reference).

The sketches produced by each probe are recursively aggregated by the mediator nodes of the tree. The aggregation of sketches is simply performed as a bin-wise sum thanks to their linearity properties. In FIG. 1, three distinct variables A1, A2, and A3 are considered. For instance, monitoring probe N11 has detected the values A1=30, A2=15, and A3=10. On the other hand, monitoring probe N12 has detected the values A1=40, A2=20, and A3=12. After forwarding the obtained results to mediator N21, this node performs the aggregation.

In this simple use case, the pattern which a nodes looks for within the aggregated summaries is based on whether there is a key whose total aggregated value exceeds a user-defined (i.e., operator-defined) threshold. This condition, in turn, translates into checking whether at least one bin in each row of the sketch exceeds the threshold. Such a check can produce false positives (which will be discarded during the backtracking process), but deterministically excludes false negatives. Again, it is pointed out that, at this stage, it is possible to reveal whether one key exceeding the threshold exists, but it is not possible to identify such a key: that will be made possible after the backtracking phase.

According to the predefined configuration of FIG. 1, it is intended to trigger a backtracking process in case the counter associated to a given of the variables A1, A2, and A3 overcomes a value of 150. Furthermore, it is intended to propagate backtracking when the local estimate for a counter of interest overcomes a value of 40. In the aggregated summary obtained by mediator node N21 there is no bin over the predefined threshold, so there is no further activity required by this node. In the aggregated summary obtained by mediator node N22 there is only one row over the predefined threshold (value 155), so there is no further activity required by this node either. However, in the aggregated summary obtained by node N3 there are both rows above the predefined threshold (values 160 in the upper row, and value 247 in the lower row). Therefore, node N3 triggers a backtracking process, which is illustrated by dotted arrows.

The backtracking is performed as follows: The node triggering the alarm, i.e. node N3 in the present case, forwards the indices of the bins which have exceeded the threshold to its children, i.e. to mediator nodes N21 and N22. Each child inspects the corresponding bins on its local cached sketch. The respective bins are indicated by the dotted rectangles. By taking their minimum value, each child issues an estimate of the aggregated counter value as observed by its descendant probes. If such an estimate is higher than a pre-defined backtracking threshold, the backtracking request is forwarded recursively to the next children. In the embodiment of FIG. 1, this results in the backtracking request being further forwarded to monitoring probes N12 and N14. In cases of monitoring probes N11 and N13 the estimates of the aggregated counter value do not exceed the pre-defined backtracking threshold (value=40), thus no backtracking is carried out to these probes.

By taking into account the properties of the data structures which have been described above, and the well known properties of the tree topologies, the following observations can be made with respect to scalability and privacy preservation:

The state, the amount of processing, and the number of messages to be handled by each mediator node are constant with respect to the number of probes and the level of the tree.

The number of aggregation levels of the tree (and, in turn, the maximum number of checks needed to detect a pattern) grows logarithmically with the number of probes, thus providing good scalability.

Although suspicious behavior of individual users can be detected upon aggregation, no information about their identity is leaked.

Since the number of hops for both aggregation and backtracking is limited, the monitoring probes can safely discard their logs based on a timeout.

In the second use case, illustrated in FIG. 2, the goal of the application is to find matching patterns among the output of different monitoring activities. In FIG. 2 the same network topology is depicted as in FIG. 1. For simplicity's sake it is assumed that each probe is performing several monitoring activities and that each of them issues a set of relevant network variable keys with respect to which a given behavior has been detected; the output of the monitoring activities is then correlated in order to detect a subset of keys that has been marked as relevant by all of the monitoring activities.

At each probe, each monitoring activity produces a Bloom Filter (BF), which summarizes the set of network keys which have been labeled as relevant. For simplicity's sake, Bloom filters are depicted in FIG. 2 as using only one hash function. All the Bloom filters are sent to the parent node for aggregation. The mediator node, in turn, aggregates all the BFs associated with the same monitoring activity by simply performing a bit-wise "or" operation. The pattern check is then performed as a bit-wise "and" over the aggregated Bloom filters. If the resulting vector is composed only by zeros, no matching keys have been found; otherwise backtracking can be triggered.

The backtracking check, in this case, is straightforward: the indices of the bits which were set in the pattern check vector are passed down the tree (as illustrated by the dotted line arrows). The intermediate nodes check the corresponding bits in their cached BFs and, in case all of them are set, propagate the backtracking request down to their children. In the scenario of FIG. 2 the backtracking request is propagated down to monitoring probes N11 and N13, but not to monitoring probes N12 and N14.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for monitoring a network, wherein said network has a connected graph topology, in particular a tree structure, said method comprising:
   a plurality of monitoring nodes collecting network measurement data,
   each of a plurality of mediator nodes performing at least a task of aggregating the collected network measurement data received from different monitoring nodes and/or other mediator nodes, and at least one root entity that receives the collected network measurement data and/or the aggregated network measurement data from said mediator nodes, wherein said aggregation of the collected network measurement data is performed by said mediator nodes condensing network measurement data into a summarized probabilistic data structure, wherein each of said mediator nodes performs a pattern check on its summarized data structure for an anomalous pattern, wherein a mediator node, in case a pattern check outputs any anomalous pattern, triggers a recursive backtracking process to the monitoring nodes and/or other mediator nodes that have collected the data measurement data relevant to the output anomalous pattern, the backtracking process using the locally cached of said summarized data structure to locate said the monitoring nodes and/or other mediator nodes that have collected the data measurement data relevant to the output anomalous pattern, and wherein at each of said monitoring nodes and/or other mediator nodes that have collected the data measurement data relevant to the output anomalous pattern, the backtracking process recursively uses locally cached information to locate further ones of said the monitoring nodes and/or other mediator nodes that have collected the data measurement data relevant to the output anomalous pattern.

2. The method according to claim 1, wherein said summarized data structures include Bloom Filters, sketches, or combinations thereof.

3. The method according to claim 2, wherein each of said mediator nodes caches a local copy of said summarized data structure it has generated.

4. The method according to claim 2, wherein each of said mediator nodes performs a pattern check on its summarized data structure.

5. The method according to claim 1, wherein each of said mediator nodes caches a local copy of said summarized data structure it has generated.

6. The method according to claim 5, wherein each of said mediator nodes performs a pattern check on its summarized data structure.

7. The method according to claim 1, wherein said backtracking process is triggered by the mediator node by way of issuing a backtracking request to its children, wherein said backtracking request includes information about said anomalous pattern.

8. The method according to claim 7, wherein each of said mediator nodes that receives a backtracking request checks its cached copy of the summarized data structure against said backtracking request.

9. The method according to claim 8, wherein a mediator node, in case said check reveals that any node having contributed to its summarized data structure may have logged relevant data, forwards said backtracking request to its children.

10. The method according to claim 9, wherein in case the backtracking request reaches any of said monitoring nodes, the data logged by said monitoring nodes is examined.

11. The method according to claim 8, wherein in case the backtracking request reaches any of said monitoring nodes, the data logged by said monitoring nodes is examined.

12. The method according to claim 7, wherein in case the backtracking request reaches any of said monitoring nodes, the data logged by said monitoring nodes is examined.

13. The method according to claim 1, wherein said monitoring nodes release information with respect to collected network measurement data only to parties that present appropriate credentials.

14. The method according to claim 1, wherein logs of said monitoring nodes are discarded based on a timeout.

15. The method according to claim 1, wherein said monitoring nodes and/or said mediator nodes are configured to produce said probabilistic data structures periodically.

16. The method according to claim 1, wherein,
said summarized probabilistic data structures are non-reversible thereby preventing leakage of information about specific users of the network.

17. The network including a monitoring functionality of monitoring a network, wherein said network comprises:
a plurality of monitoring nodes arranged as leaves in a tree structure, each said monitoring node including a probe that collects the network measurement data,
a plurality of mediator nodes arranged as inner nodes within said tree structure, each mediator node including a probe that performs at least a task of aggregating the collected network measurement data received from different monitoring nodes and/or other mediator nodes, wherein said mediator nodes perform said aggregation of the collected network measurement data by condensing network measurement data into a summarized probabilistic data structure, said summarized probabilistic data structures include local caches for recursive backtracking, and said summarized probabilistic data structures are non-reversible thereby preventing leakage of information about specific users of the network, and
at least one root entity that receives the network measurement data and/or the aggregated network measurement data from said mediator nodes.

18. A method for monitoring a network, wherein said network has a connected graph topology, in particular a tree structure, said method comprising:
a plurality of monitoring nodes collecting network measurement data,
each of a plurality of mediator nodes performing at least a task of aggregating the collected network measurement data received from different monitoring nodes and/or other mediator nodes, and
at least one root entity that receives the collected network measurement data and/or the aggegated network measurement data from said mediator nodes,
wherein said aggregation of the collected network measurement data is performed by said mediator nodes condensing network measurement data into a summarized probabilistic data structure, wherein,
at least one of said mediator nodes performing the task of aggregating the collected network measurement data, receive the collected network measurement data from both different monitoring nodes and other mediator nodes,
each of said mediator nodes performs a pattern check on its summarized data structure for an anomalous pattern, the pattern check being dependent on an application consuming the collected network measurement data, an identified anomalous pattern triggering a recursive backtracking process to the monitoring nodes and/or other mediator nodes that have collected the data measurement data relevant to the output anomalous pattern using locally cached information to locate the monitoring nodes and/or other mediator nodes that have collected the data measurement data relevant to the output anomalous pattern, and at each of said monitoring nodes and/or other mediator nodes that have collected the data measurement data relevant to the output anomalous pattern, the backtracking process recursively uses locally cached information to locate further ones of said the monitoring nodes and/or other mediator nodes that have collected the data measurement data relevant to the output anomalous pattern.

* * * * *